United States Patent [19]

Proglyada

[11] Patent Number: 5,092,494
[45] Date of Patent: Mar. 3, 1992

[54] APPARATUS FOR METERING FLUID

[75] Inventor: Leonid P. Proglyada, Kharkov, U.S.S.R.

[73] Assignee: Tselevoi Nauchno-Tekhnichesky Kooperativ "Stimer", Kharkov, U.S.S.R.

[21] Appl. No.: 474,719

[22] PCT Filed: May 24, 1989

[86] PCT No.: PCT/SU89/00136

§ 371 Date: Apr. 10, 1990

§ 102(e) Date: Apr. 10, 1990

[87] PCT Pub. No.: WO90/01681

PCT Pub. Date: Feb. 22, 1990

[30] Foreign Application Priority Data

Aug. 10, 1988 [SU] U.S.S.R. .................. 4466715

[51] Int. Cl.$^5$ ............................................. G01F 11/00
[52] U.S. Cl. ...................... 222/250; 222/273; 222/404
[58] Field of Search ............ 222/249, 250, 335, 263, 222/267, 273, 404; 417/396, 399

[56] References Cited

U.S. PATENT DOCUMENTS

| | | | |
|---|---|---|---|
| 2,137,384 | 11/1938 | Browne | 222/250 |
| 2,883,088 | 4/1959 | Downing | 222/250 |
| 3,709,205 | 1/1973 | Downing | 222/250 |

FOREIGN PATENT DOCUMENTS

| | | |
|---|---|---|
| 2222640 | 10/1974 | France . |
| 396559 | 8/1973 | U.S.S.R. . |
| 1219924 | 3/1986 | U.S.S.R. . |

OTHER PUBLICATIONS

I.B.M. Technical disclosure Bulletin, "Hydraulic Arrangement" by G. W. Scott, May 1962.
V. V. Behman, Racing Cars, Leningrad, Mashinostroenic Publishing House, 1980, pp. 147-149.

Primary Examiner—Michael S. Huppert
Assistant Examiner—Anthoula Pomrening
Attorney, Agent, or Firm—Fleit, Jacobson, Cohn, Price, Holman & Stern

[57] ABSTRACT

An apparatus for metering fluid has a casing (1) accommodating a rotor (2) having a closed interior space. The interior space of the rotor (2) is divided by partitions (3) into measuring chambers (4) each accommodating a free piston (5) dividing the measuring chamber into a metering space (6) and a control space (7) located on either side of the piston (5). There is provided a batch controller having a variable capacity chamber (18) communicating with all control spaces which are connected in parallel with one another. Each chamber (4) has a port (10) regularly communicating through a port (8) with a metered fluid supply line and with a port (9) for discharging metered fluid.

2 Claims, 1 Drawing Sheet

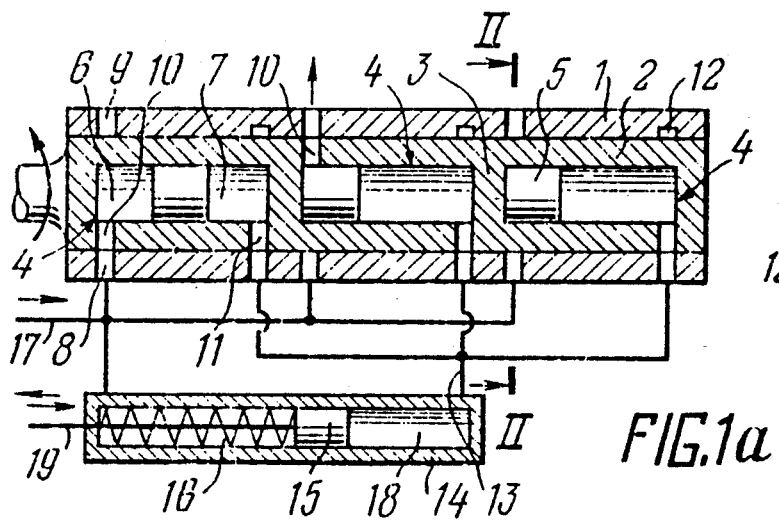
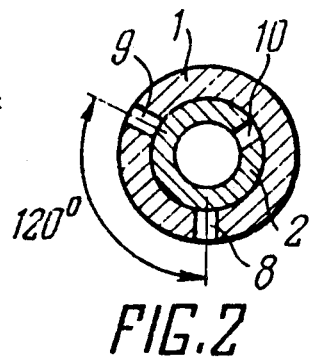
FIG.1a
FIG.2
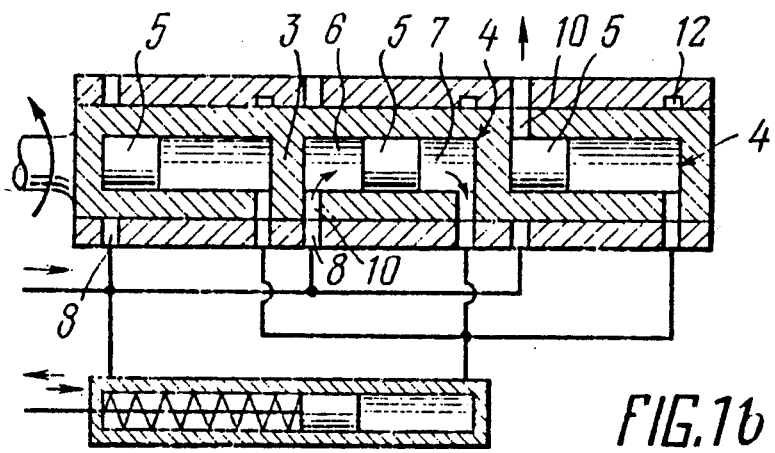
FIG.1b
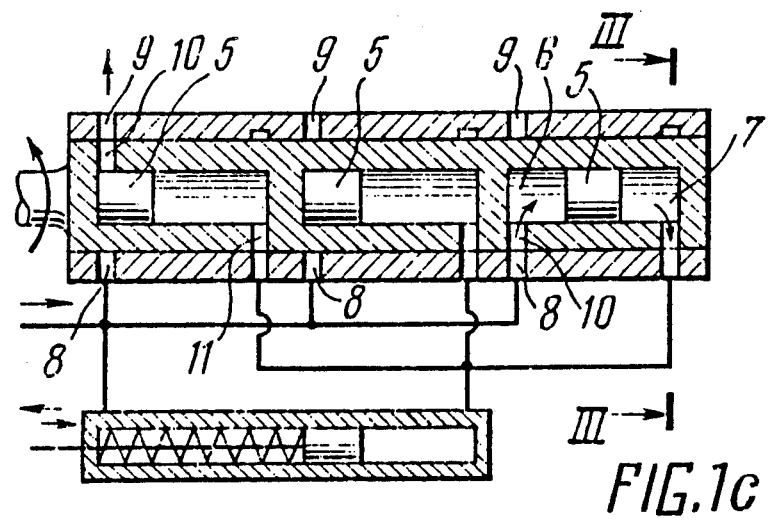
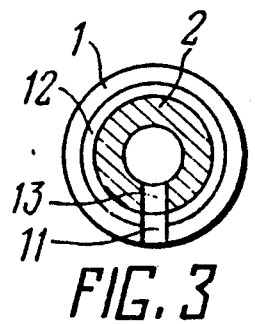
FIG.1c
FIG.3

1

APPARATUS FOR METERING FLUID

FIELD OF THE ART

The invention relates to apparatuses for metering fluid.

BACKGROUND ART

Known in the art is an apparatus for metering fluid comprising a measuring chamber having a free piston, the end spaces of the chamber being connected to a distributor of flows of the metered fluid, and a batch corrector having an abutment provided in the first end space of the measuring chamber and connected to a control unit. The batch is corrected by limiting stroke of an auxiliary plunger provided inside the free piston by moving said abutment (SU, A, 1219924). While this metering apparatus ensures a high enough metering accuracy, it is rather complicated in structure and is of a low reliability in operation.

Known in the art is an apparatus for metering fluid having a batch controller and a rotor accommodated in a fixed sleeve. The sleeve and the rotor have radial ports for the admission and discharge of metered fluid connected to respective pipelines. The inner passage of the rotor is closed of the ends thereof and is divided into measuring chambers by free pistons mounted therein. The measuring chambers are capable of regularly communicating with the radial ports and their number is equal to the number of discharge passages. One of the end sides of the inner passage of the rotor is closed by means of an abutment which is movable in the passage and is operatively connected to a mechanism for its movement to form a batch controller (cf. V. V. Bekman, Racing Cars. Leningrad. Mashinostroenie Publishing House. 1980. pp. 147-149). The latter is in the form of a sophisticated mechanical system consisting of a number of cooperating parts so as to lower reliability and response speed owing to inertia of the system.

DISCLOSURE OF THE INVENTION

The invention is based on the problem of so constructing an apparatus for metering fluid as to have a simple design ensuring actuation of the apparatus following a comparatively weak control signal with high reliability and accuracy.

This problem is solved by that in an apparatus for metering fluid comprising a casing accommodating a rotor having a closed interior space which has measuring chambers with free pistons, each having a port regularly communicating with a metered fluid supply line and a passage for a metered discharge of fluid, and a batch controller, according to the invention, the interior space of the rotor is divided by partitions into measuring chambers each accommodating a free piston dividing the measuring chamber into a metering space and a control space located on either side of the piston, the batch controller having a variable-capacity space communicating with all control spaces of the measuring chambers which are connected in parallel with one another.

This apparatus has a very simple mechanical system wherein the number of mechanically cooperating parts is minimized so as to ensure high response speed and accuracy. The hydraulic control of the apparatus also contributes to a better accuracy and higher response speed.

It is preferred that the variable capacity space be provided with a piston, and the piston space thereof communicate with the control spaces and the piston rod space communicate with the fluid supply line, the piston being axially biased by a spring on the side of the piston rod space.

BRIEF DESCRIPTION OF THE DRAWINGS

These and other features and advantages of the invention will be better understood from the following detailed description of its specific embodiment illustrated in the accompanying drawings, in which:

FIGS. 1 *a, b, c,* schematically show, in section, an apparatus for metering liquid in three consecutive positions of a piston in each chamber;

FIG. 2 is a sectional view taken along line II—II in FIG. 1*a*;

FIG. 3 is a sectional view taken along line III—III in FIG. 1.

PREFERRED EMBODIMENT OF THE INVENTION

An apparatus for metering liquid comprises a casing 1 comprising a fixed sleeve which accommodates a cylindrical rotor 2 rotated by a drive (not shown) and which is in the form of a cylinder having an interior space closed at the ends thereof by blind walls. The interior space of the cylinder is divided by means of partitions 3 into measuring chambers 4. The number of the measuring chambers is equal to the number of discharge passages (not shown) which are three in this embodiment. Each measuring chamber 4 accommodates a free piston 5 dividing the chamber 4 into a metering space 6 and a control space 7 which are formed on either side of the piston 5.

The casing 1 has radial ports 8 and 9 located at an angle of 120° with respect to each other for the admission and discharge of metered liquid. The rotor 2 has three radial ports 10, one per each metering space 6 for the admission and discharge of liquid to and from the metering spaces, respectively. The rotor 2 also has radial ports 11. Each port 11 communicates with an annular groove 12 provided in the inner surface of the casing 1. The ports 11 and grooves 12 form means for communication of the spaces 7 with a control pipeline 13. The batch controller is in the form of a hydraulic cylinder 14 having a spring-biased piston 15. The radial ports 8 of the casing 1 and a piston rod chamber 16 of the hydraulic cylinder 14 communicate with a liquid admission pipeline 17, and a piston chamber 18 of the hydraulic cylinder 14 is connected to the control pipeline 13. The control space 7, the radial ports 11, grooves 12, pipeline 13 and piston chamber 18 of the hydraulic cylinder 14 are filled with a control fluid. The piston rod chamber 16 of the hydraulic cylinder 14 as follows from the above description is filled with metered liquid. A member 19 connected to the piston 15 is an inlet of the batch controller. Its coupling to a source of a control signal is not shown in the drawing. The coupling of the metered liquid admission pipeline 17 with a liquid source is not shown either.

The apparatus for metering liquid functions in the following manner. In the first position (FIG. 1*a*, FIG. 2), the radial port 10 of the lefthand chamber 4 and the radial port 8 of the sleeve 1 are in registry with each other and connect the metering space 6 to the metered liquid admission pipeline 17. A certain batch of metered liquid is available in the metering space 6 of the middle measuring chamber 4, and its radial port 10 is in registry with the radial port 9 of the casing 1 for discharging metered liquid and communicates with a discharge passage (not shown). Liquid from the source is supplied through the pipeline 17, ports 8 and 10 into the metering space 6 of the lefthand measuring chamber 4. The free piston 5 of this chamber is moved to the right under the liquid pressure to displace the control fluid from the control space 7 of its chamber through the radial ports 11 of the rotor, annular grooves 12 and control pipeline 13 to the control space 7 of the middle measuring chamber 4. The free piston 5 of this chamber will move to the left to displace the metered liquid from the metering space 6 of the middle chamber 4 into the discharge passage through the radial port 10 of the rotor 2 and radial port 9 of the sleeve 1 (FIGS. 1,a,b,c show positions of members of the apparatus at the end of the cycle). After rotation through 120°, the rotor 2 will take position corresponding to FIG. 1b at which the radial part 10 of the middle measuring chamber 4 and the radial part 8 of the casing 1 are in registry with each other and connect the metering space 6 of the middle chamber 4 to the liquid admission pipeline 17. The metering space 6 of the righthand measuring chamber 4 is filled with a batch of metered liquid and its radial port 10 communicates through the radial port 9 of the sleeve 1 with the discharge passage. The metered liquid from the source is supplied through the pipeline 17 and ports 8 and 10 into the metering space 6 of the middle measuring chamber 4. The piston 5 of this chamber will move to the right to displace the control fluid from the control space 7 of the middle chamber 4 into the control space 7 of the righthand measuring chamber 4. The piston 5 of the righthand measuring chamber 4 will move to the left to displace the metered liquid from the metering space 6 through the ports 9 and 10 into the discharge passage. After rotation through another 120°, the rotor 2 will take a third position corresponding to FIG. 1c and FIG. 3. In this case, similarly to that described above, the metered liquid will fill the metering space 6 of the righthand measuring chamber 4, and a batch of liquid will be displaced into the discharge passage from the metering space 6 of the lefthand measuring chamber 4. The control of the amount of batch is carried out by changing position of the piston 15 of the hydraulic cylinder 14 by acting upon the member 19 by an inlet signal. The capacity of the piston chamber 18 will decrease, and the control fluid will move from the control space 7 so that movement of the free pistons 5 of the measuring chambers 4 will move to the left to reduce capacity of the metering spaces 6. If the piston 15 will move to the left, capacity of the piston chamber 18 will increase, and the free pistons 5 will move to the right under pressure of the metered liquid so that capacity of the metering spaces will increase, and a batch of metered liquid delivered by the apparatus will also increase. If the control signal is constant, the batch delivered by the apparatus will also remain unchanged. Pressure permanently acts in the piston rod chamber 16 upon the piston 15. This pressure balances pressure of the control fluid applied to the piston. Accordingly, no strong force is required on the side of the control signal to move the piston 15. A spring provided in the piston rod chamber 16 tends to hold the piston in the initial position.

A preferred embodiment of the invention was described above, which may be modified within the scope of the invention. Thus, the number of measuring chambers may be changed, and at least two such chambers should be provided, and a different design of a batch controller may also be used.

INDUSTRIAL APPLICABILITY

The invention may be most advantageously used in a vehicle having a steam power plant for controlling supply of a batch of fluid to an expansion engine.

I claim:

1. An apparatus for metering a fluid, comprising a casing 1 accommodating a rotor 2 having a closed interior space having measuring chambers 4 and free pistons 5, each chamber having a radial port 10 regularly communicating through a corresponding radial port 8, provided in casing 1, with a metered fluid feed pipeline 17, and through a corresponding radial port 9 also provided in casing 1 with a metered fluid discharge passageway and a batch controller, characterized in that the interior space of rotor 2 is divided by partitions 3, fixed to the rotor, into measuring chambers 4 each accommodating a free piston 5 dividing the chamber into a metering space 6 and a control space 7 located on either side of piston 5, and in that the batch controller has an adjustable-capacity space 18 communicating in parallel with all control spaces 7.

2. An apparatus according to claim 1, characterized in that the adjustable capacity space 18 is provided with a piston 15 defining a subpiston space 16 communicating with metered fluid feed pipeline 17 and has a spring for adjusting piston 15 in an axial direction.

* * * * *